United States Patent [19]
Boiting et al.

[11] Patent Number: 4,592,679
[45] Date of Patent: Jun. 3, 1986

[54] PNEUMATIC CONVEYING PROCESS AND APPARATUS

[75] Inventors: Hans H. Boiting, Steinfurt; Bernd Federhen, Siegen; Gerhard Müller-Späth, Freudenberg, all of Fed. Rep. of Germany

[73] Assignee: Alb. Klein GmbH & Co. KG, Niederfischbach, Fed. Rep. of Germany

[21] Appl. No.: 473,588

[22] Filed: Mar. 9, 1983

[30] Foreign Application Priority Data

Mar. 10, 1982 [DE] Fed. Rep. of Germany ....... 3208616

[51] Int. Cl.$^4$ ............................................. B65G 53/46
[52] U.S. Cl. .................................... 406/127; 406/45; 406/197
[58] Field of Search .................. 406/45, 32, 24, 25, 406/197, 198, 192, 127; 239/325, 654

[56] References Cited

U.S. PATENT DOCUMENTS 3,570,716 3/1971 Kirsanoff ............................. 406/32
4,389,143 6/1983 Nadin et al. ...................... 406/45 X

FOREIGN PATENT DOCUMENTS 11469 1/1980 Japan ................................... 406/127

Primary Examiner—Jeffrey V. Nase
Assistant Examiner—L. E. Williams
Attorney, Agent, or Firm—Bachman & LaPointe

[57] ABSTRACT

In a process and apparatus for pneumatically conveying loose material in grain or dust form by discharge thereof from a conveyor container, through a conveyor conduit disposed downstream thereof, after the conveyor container has been emptied and before the conveyor conduit is also emptied of the loose material being conveyed, the conveyor conduit is closed at both ends, to maintain that existing condition. After the conduit is thus closed off at both ends, leakage losses of conveying gas are compensated for by supplying a leakage make-up amount. The apparatus has a conveyor conduit which is provided at each of its end portion towards the conveyor conduit and its discharge end portion with at least one closure member to act as inlet and outlet valves respectively. At least one gas feed line from a leakage make-up valve opens into the conduit.

2 Claims, 3 Drawing Figures

PNEUMATIC CONVEYING PROCESS AND APPARATUS

BACKGROUND OF THE INVENTION

The invention relates to a process and apparatus for pneumatically conveying granular and dust materials from a conveyor container or vessel, in a conveyor conduit which is connected to the outlet thereof.

Materials in grain or particulate and dust form may be transported through pipe conduits, by means of a flow of gas, various pneumatic conveying processes having been developed, depending on the specific properties of the materials concerned and the grain size range thereof. Processes of that kind aim on the one hand to convey the maximum amounts of the materials concerned, with the minimum amount of conveying air, in order to save energy which is becoming increasingly expensive, that is to say, to achieve a high material loading factor (in other words: the weight in kg of material per kg of air). In addition, another endeavour is to operate the process with a low conveying speed, thereby to reduce the rate of wear.

The magnitude of the possible material loading factor is dependent on the density of the material to be conveyed, its porosity, the density and viscosity of the conveying gas and the friction conditions in the conveyor conduit. The conveyor pressure required also rises, with an increasing material loading in the flow of gas. If the maximum possible loading is exceeded, then the conveyor conduit becomes blocked.

If the material to be conveyed is a product of high porosity, for example a dust-free granulate, the conveying gas can penetrate through the pores of the product, to the end of the conveyor conduit. When that happens, individual compact plugs or blockages of material are formed, starting from the end of the conveyor conduit, and those plugs move towards the end of the conduit at a relatively low speed.

The effect of plugs of material which are formed automatically is utilised for pneumatically conveying porous loose or bulk materials, for example plastic granular material and quartz sands with a low dust content.

For the purpose of feeding such materials into the conveyor conduit, use is made of conveyor containers or vessels which are provided with measuring means for measuring the level of filling of the material therein. If the conveyor container is empty, then the compressed air therein is released, and any material which may still be in the conveyor conduit can remain therein until the next conveying cycle is carried out. During the subsequent conveying cycle, the conveying agent penetrates through spaces within the conveyor conduit to the end thereof, and the above-described pneumatic conveying operation begins, with automatically forming plugs of material.

That conveying process suffers from serious disadvantages. On the one hand, it can only be carried out when dealing with porous substances which provide for the automatic formation of plugs of material, while on the other hand, there is no conveying action in the initial phase of a conveying cycle, in which the conveying agent is penetrating through the spaces in the material in the conduit, to the end thereof. Those dead or non-productive periods are considerable, when dealing with low-porosity materials and when the distances over which the materials have to be conveyed are of considerable length. Such dead periods must be compensated by a higher level of conveying efficiency in the actual conveying phase, and that greatly increases the capital investment and operating costs.

Substances with a very low level of porosity must be conveyed at a higher speed and with a lower material loading factor, in order to avoid blockages from occurring. In order to be able to begin a fresh conveying cycle, the product does not remain in the conveyor conduit at the end of the conveying operation, but the conduit is flushed out with the conveying agent, that is to say, air, until it is free of product therein. That takes up time which is therefore not available for conveying material, and also consumes conveying agent which cannot be employed for conveying purposes.

Both of those particular features gives rise to increased capital investment and operating costs. Another disadvantage is that the speed of conveying gas in the conveyor conduit increases considerably when the amount of material in the conveyor conduit decreases in the blow-through or conduit-emptying phase. Depending on the product in question, that results in damage to the product or to the conveyor conduit.

When dealing with materials with an insufficient degree of porosity, the attempt is made to achieve the advantages which are attained by the operation using plugs of material for producing the conveying effect by passing the product from the container into the conveyor conduit, in separated portions, either by cyclic control of the feed of air to the container, or by rhythmic actuation of a valve where the container communicates with conduit.

If the plugs of material formed are of excessive porosity or if the conveying gas can flow past the plugs of material in the conduit, for example at bends in the conduit, then the plugs of material tend to catch up with each other, resulting in longer plugs. When that happens, the conveying pressure available is generally no longer sufficient to move the longer plugs and the conduit tends to block.

In addition, when the installation has conveyor paths of considerable lengths, systems of that kind are only suitable for materials which form very firm, compact plugs.

In order to be able to effect the plug conveying operation with materials which are not ideally suited thereto, an attempt has been made to provide for artificial stabilization of the conditions in the conveyor conduit. For that purpose, installations use means for feeding air into the conveyor conduit at points distributed therealong, secondary or by-pass conduits on and in the conveyor conduit, and even means for feeding extra air into the conveyor conduit along the length thereof, such means being controlled in dependence on pressure.

Apart from the technical problems already referred to above, another serious disadvantage with such processes is the high investment costs and problems in regard to cleaning the conveyor conduits.

SUMMARY OF THE INVENTION

An object of the present invention is to provide a process and apparatus for pneumatically conveying loose material in dust or finely particulate form, which are suitable for materials or substances with widely different porosities and which permit conveying thereof without the above-described disadvantages, particularly in the start-up and terminal phases of a conveying cycle.

Further objects will be apparent hereinafter, such as avoiding technical deficiencies and high maintenance and capital investment costs.

That object is achieved in that, after the conveyor container emptying operation and before the conveyor conduit is emptied of the loose or bulk material or the substances being conveyed, the conveyor conduit is closed at both its ends, maintaining that actual or existing condition. When that is done, after the material-carrying conveyor conduit is closed off at both ends, leakage losses in respect to conveying gas or conveying air are to be compensated by a feed of leakage make-up gas. Therefore, that procedure provides that, when the conveyor container or vessel becomes empty, but while the conveyor conduit is still carrying material, the conveyor conduit is closed off at its inlet and at its outlet ends, by means of valves or the like closure members, and conveying gas which escapes from the closed conduit system due to possible leakage at the closure members or in the conveyor conduit itself, is compensated by a feed of gas which may be referred to as a leakage gas feed or gas make-up; it may be said therefore that the actual or existing condition in the conveyor conduit is frozen.

When starting up a fresh conveying cycle after the conveyor container has been filled, in accordance with the invention, the pressure in the conveyor container is matched to that in the conveyor conduit, and then the valves or closure members at both ends of the conveyor conduit are opened.

By virtue of the above-defined features, there is no start-up and terminal phase within each conveying cycle, which could require the consumption of conveying gas and time, without producing an actual conveying action. In addition, operation may now be independent of the porosity of the material to be conveyed, and additional devices and means which are distributed over the length of the conveyor conduit can be omitted.

The invention also provides that the location or locations at which the gas make-up is introduced into the conduit may be selected as required within the conveyor conduit or the closure members, and the time at which the make-up feed of gas is switched on and switched off may also be selected as desired. Likewise, the pressure in the conveyor conduit when the valves are closed and the pressure difference between the conveyor container and the conveyor conduit, at which the valves shutting off the conveyor conduit are opened simultaneously or successively, may also be a matter of free choice according to circumstances.

The apparatus according to the invention is distinguished in that the conveyor conduit is provided with at least one closure or blocking member both at its connection to the conveyor container and at its outlet end or discharge. Advantageously, an air feed line of a leakage air valve opens into the conveyor conduit and/or a closure or blocking member, preferably directly downstream of the inlet valve of the conveyor conduit.

The invention also provides that the interior of the conveyor container is connected to the conveyor conduit or the interior thereof by a pressure line which includes a differential pressure switch or the like, in order to be able to effect the described pressure compensating or balancing operation. In that connection, it has been found desirable for the pressure line to be arranged to terminate in the head space or top portion of the conveyor container.

In accordance with the invention, the conveyor container or the inlet valve or the corresponding closure or blocking member is provided with at least one minimum level probe or detector means, which is connected to a control member of the inlet valve. That arrangement makes it possible for the inlet valve and the outlet valve to be closed, in order so-to-speak to put the conveyor conduit into the frozen condition, before the inlet end of the conveyor conduit has run completely dry of material.

Although in principle conventional valves for blocking off a flow of loose or bulk materials, for example flap valves, slide valves, ball-type valves or pinchcock type valves may be used for carrying out the described process, such devices being used both individually and also in succession in groups, for reasons of achieving enhanced shut-off sealing, it has been found particularly desirable for the closure members to be in the form of plate or disc type valves.

In that connection, the entry valve at the entry end of the conveyor conduit may keep the line for the above-mentioned differential pressure switch or the like closed, when the conveyor conduit is in an open condition; that represents a simplification in the equipment required.

In a preferred embodiment of this invention, the closure member or outlet valve at the end of the discharge conduit is designed in the form of a tandem valve; in that arrangement, a plate or disc member is associated with the mouth opening of the conveyor conduit which in turn terminates in an outlet housing, the discharge aperture of which can be closed by the other plate or disc member; advantageously, both plate or disc members of the valve are arranged displaced relative to each other and/or are automatically switched over at different times; the one valve first closes off the mouth of the conveyor conduit; then, after the discharge housing has run empty, it is shut off in a gas-tight manner by means of the other valve.

BRIEF DESCRIPTION OF THE DRAWINGS

Further advantages, features and details of the invention will be apparent from the following description of preferred embodiments and with reference to the drawings in which.

DESIGNATION OF PREFERRED EMBODIMENTS

Figure 1:
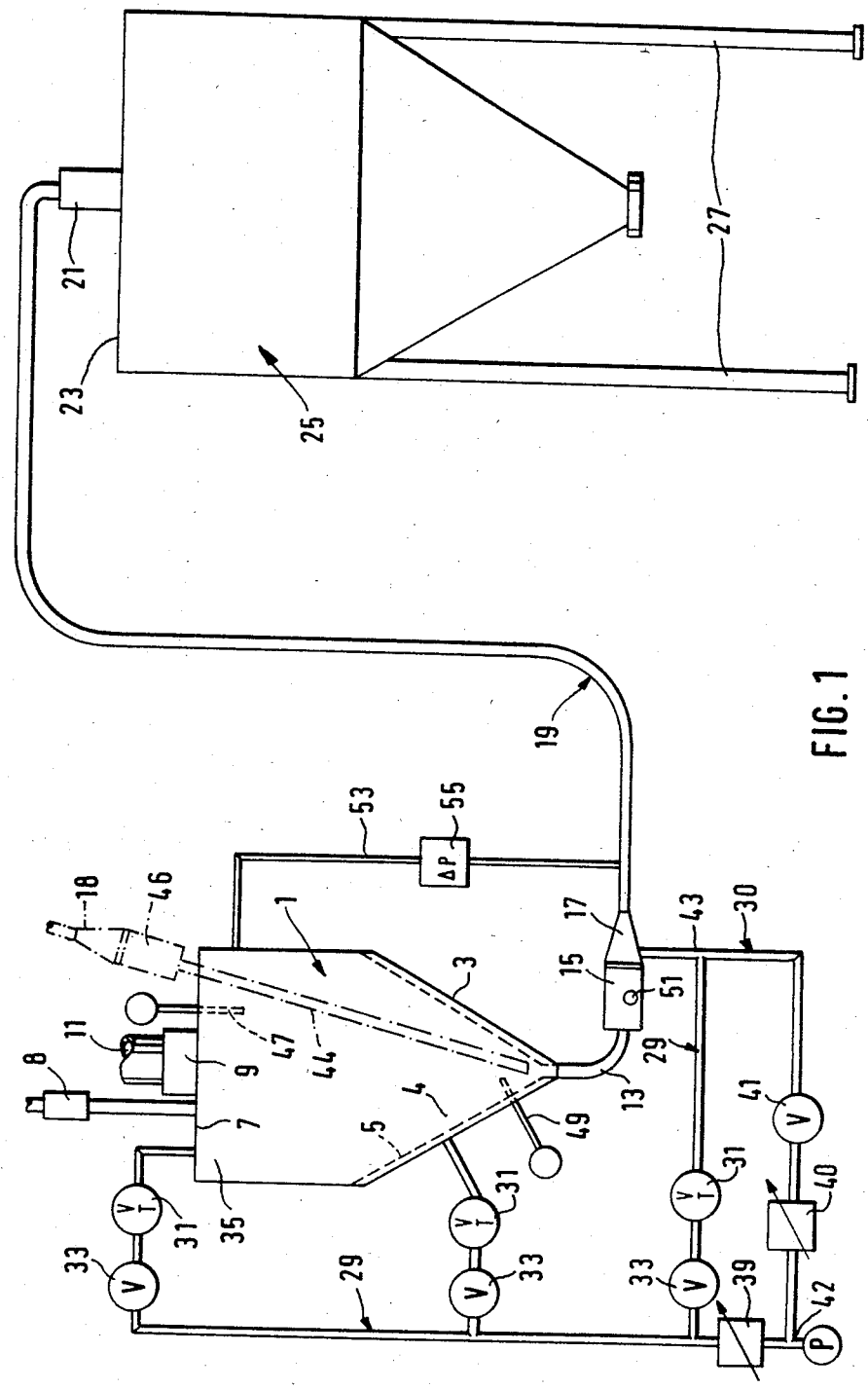
FIG. 1 is a diagrammatic view in partial section of a conveyor installation with valves disposed in a conveyor conduit.

A conveyor vessel or container 1 is provided which has a tapered bottom portion 3 and a fluidizing insert member 5 disposed parallel to and at a spacing from the bottom portion 3. Container 1 is also provided with a cover plate 7 thereof, and a pressure release valve 8, and an intake pipe 11, which includes a closure member 9, for material in dust form which is to be conveyed in the installation.

A curved outlet pipe 13 at the bottom of the portion 3 of the container 1 carries a valve 15 having an associated air feed means 17, a conveyor conduit 19 being connected thereto. The conveyor conduit 19 terminates at a further valve 21 above the cover 23 of a receiving container or silo 25 on support stands or legs 27.

At the conveyor container 1, a conveying gas line 29 coming from a pressure regulator 39 opens on the one hand into a head space 35 in the container 1, by way of interposed throttle means 31 and conveying gas valves 33, and on the other hand into a fluidization chamber 4 at the fluidization insert member 5 and also into the air feed member 17.

A transverse line 30 having its own pressure regulator 40 and a leakage air valve 41 branches off the conduit 29 upstream of the pressure regulator 39, at location 42. The line 30 meets the line 29 again at the location indicated at 43.

A maximum level probe or detector 47 projects into the conveyor container 1 from the top thereof and a minimum level probe or detector 49 projects into the bottom region of the container 1. A further minimum level sensor, possibly as an alternative to the sensor 49, is disposed at 51 in the inlet valve 15 of the conveyor conduit 19. A conduit 53 which extends between the head space 35 in the container 1 and the conveyor conduit 19 includes a differential pressure switch 55. In addition, in FIG. 1, a dip or immersion pipe 44 which projects into the conveyor container 1, the pipe 44 including a valve 46 and an air feed member 18, is illustrated as an alternative to the outlet pipe 13, the valve 15 and the air feed member 17, if a conveyor conduit connection above the conveyor container 1 is required; in that case, the conveyor gas line 29 communicates with the air feed member 18, although that alternative arrangement is not shown in the drawing.

When a conveying cycle is terminated, the minimum level sensors 49 and 51 detect the empty condition of the conveyor container 1, and the inlet valve 15 and the outlet valve 21 are closed. A certain amount of gas then passes into the conveyor conduit 19, which is thus closed at both ends, through the air feed member 17. The amount of gas introduced into the conduit is sufficient to replace the leakage loss which occurs due to leakage of the conduit or at the valves.

The conveyor container 1 is relieved by way of its relief valve 8 and then filled with material to be conveyed, until the maximum level sensor 47 responds. The feed of material is now shut off by operation of the closure member 9 and conveying gas is supplied to the conveyor container 1 through the line 29.

When the differential pressure switch 55 operates, the valves 15, 45 and 21 are opened and the conveying procedure is continued.

Figure 2:
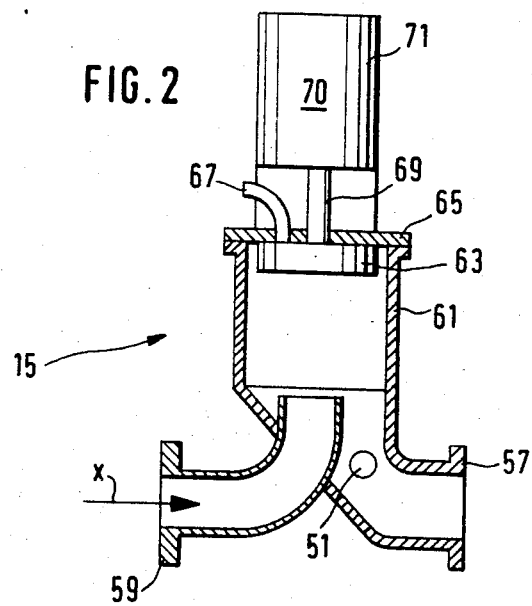
FIG. 2 shows a view on an enlarged scale in cross-section through a conveyor conduit valve.

A particularly advantageous embodiment in respect of the inlet valve 15 disposed at the upstream end of the conveyor conduit 19 is shown in FIG. 2. The inlet valve 15 is connected by means of a flange 57 to the air feed member 17, and disposed opposite thereto is a valve seat 59 on the outlet pipe 13, from which the material to be conveyed flows in the conveying direction indicated by x.

Mounted in a cylindrical housing 61 is a valve plate or disc member 63, underneath a valve cover 65, from which there projects a connecting member 67 for the differential pressure switch 55 (FIG. 1), the connection 67 being masked and closed when the valve 15 is in the open position. The valve plate or disc member 63 is carried on a piston rod 69 of a piston 70 of an actuating piston cylinder unit 71 which is only diagrammatically indicated in FIG. 2, for the sake of simplicity of the drawing.

Figure 3:
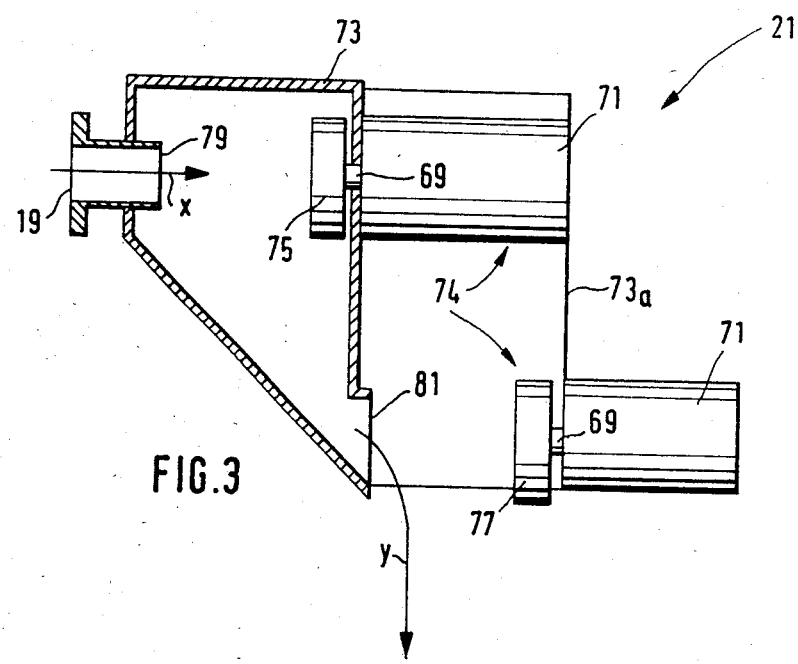
FIG. 3 shows a view on an enlarged scale in cross-section through another embodiment of a valve.

Both the inlet valve 15 shown in FIG. 2 and the outlet valve 21 shown in FIG. 3 at the end of the conveyor conduit are illustrated in the open positions.

The outlet valve 21 comprises, in a polygonal housing 73, two plate or disc type valves 74 which can be seen as being disposed one above the other and which are closed at different times relative to each other.

The upper valve plate or disc member 75 is disposed opposite the mouth opening 79 of the conveyor conduit and shuts off the flow of loose or bulk material therethrough when it comes to bear against the mouth opening 79. When the valve plate or disc member 75 is in the illustrated position of being at a spacing from the mouth opening 79 of the conveyor conduit, the loose or bulk material can thus flow out of the mouth opening 79.

When the lower valve plate or disc member 77 is also held at a spacing from the housing outlet 81 which is disposed opposite thereto, the loose or bulk material falls out in the direction indicated by the arrow y. After the housing 73 has emptied out, the outlet 81 thereof is gas-tightly closed by means of the lower valve plate or disc member 77.

Both the valve plate or disc members 75 and 77 are connected by way of respective piston rods 69 to the pistons of respective actuating piston cylinder units 71 which are disposed in a mounting portion 73a of the housing 73.

It will be appreciated from the foregoing that the process and apparatus described are suitable for conveying loose or bulk materials in dust, fine-grain or particulate form, of widely varying porosities.

Various modifications and variations may be made in the abovedescribed embodiments without thereby departing from the scope and spirit of the invention, for example the apparatus components described and illustrated may be replaced by others performing the same or suitably similar functions.

What is claimed is:

1. A process for pneumatically conveying loose material by discharge thereof from a conveyor container containing same through a conveyor conduit connected thereto, including the steps of: emptying the conveyor container; closing the conveyor conduit at its inlet and outlet ends after the conveyor container becomes empty and before the conveyor conduit is emptied by material being conveyed thereby to maintain the conduit substantially in its condition existing at that time; feeding a make-up amount of gas into the conduit after the conduit containing material has been closed off at its ends to compensate leakage losses and to insure the maintenance of the condition existing at the same time; and resuming the conveying operation by filling the conveyor container with material to be conveyed and matching the pressure in the conveyor container to the pressure in the conveyor conduit, whereafter the ends of the conveyor conduit are opened.

2. A process as set forth in claim 1 wherein the outlet end of the conveyor conduit is opened in a time-displaced manner relative to opening of the inlet end of the conveyor conduit.

* * * * *

UNITED STATES PATENT AND TRADEMARK OFFICE
CERTIFICATE OF CORRECTION

PATENT NO. : 4,592,679
DATED : June 3, 1986
INVENTOR(S) : HANS H. BOITING ET AL.

It is certified that error appears in the above-identified patent and that said Letters Patent is hereby corrected as shown below:

In claim 1, line 49, change "by" to read ---of---.

Signed and Sealed this

Fourteenth Day of October, 1986

[SEAL]

Attest:

DONALD J. QUIGG

Attesting Officer

Commissioner of Patents and Trademarks